Feb. 13, 1968  J. A. TURCHAN  3,369,090

DUAL BRAKING SYSTEM SAFETY DEVICE

Filed June 28, 1966

INVENTOR.
JOHN A. TURCHAN
BY
McNENNY, FARRINGTON, PEARNE & GORDON
R. H. Dickinson Jr.
ATTORNEYS

United States Patent Office 3,369,090
Patented Feb. 13, 1968

3,369,090
DUAL BRAKING SYSTEM SAFETY DEVICE
John A. Turchan, East Detroit, Mich., assignor to The Weatherhead Company, Cleveland, Ohio, a corporation of Ohio
Filed June 28, 1966, Ser. No. 561,128
6 Claims. (Cl. 200—82)

ABSTRACT OF THE DISCLOSURE

A dual brake system including a switch operable to produce a signal responsive to a pressure unbalance between the two fluid lines. The switch includes a bore containing a piston exposed to the two pressures at opposite ends. The piston has two sealing portions spaced apart by a portion of reduced diameter. The piston constitutes one switch element and is centered by means of springs so that upon a pressure inbalance the piston moves from a centered position causing one of the sealing portions to engage a second switch contact in the form of a stud projecting into the bore to complete the electric circuit and produce the signal.

---

Figure 1:
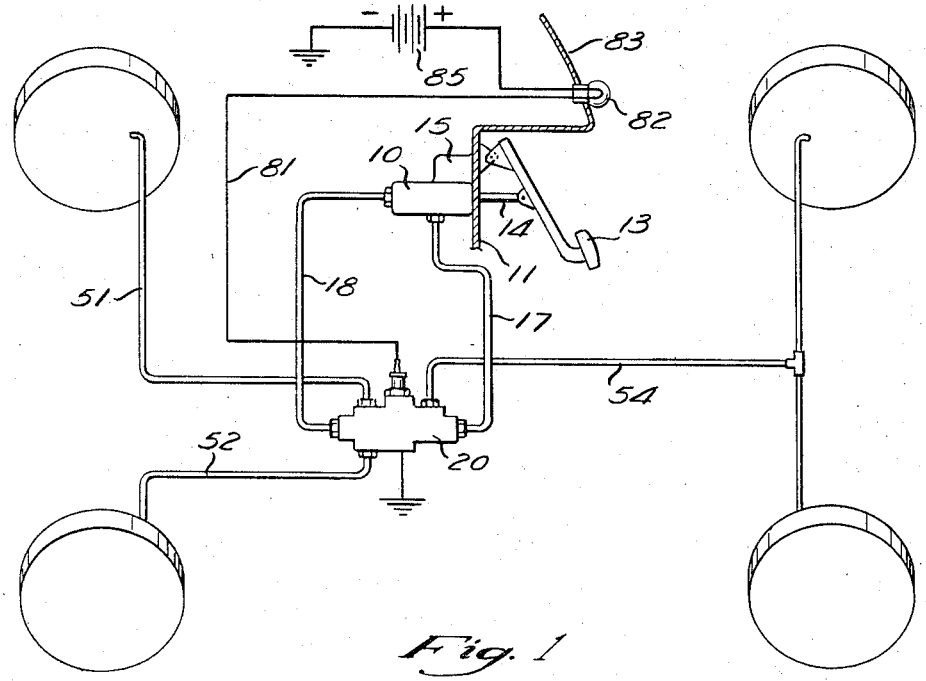

This invention relates generally to hydraulic brake systems and more specifically to dual hydraulic brake systems having two separate hydraulic circuits for separate brakes such as the front and rear brakes of an automobile.

Automobiles have long used a hydraulic brake system in which a foot pedal is used to operate a single master cylinder which serves as a pump to force hydraulic fluid throughout the system to expand slave cylinders at the individual wheels for actuation of the brakes which may be either of the drum type, or more recently, of the caliper disc type. When a system is used having a single master cylinder for forcing the fluid to the individual wheels, leakage at any point in the system results in a loss of fluid and even a complete loss of pressure so that the brakes are no longer operative and can no longer be used for bringing the vehicle to a stop.

In order to overcome the complete loss of the service brakes as a result of a loss of fluid or system pressure, there have been devised dual braking systems in which the hydraulic circuits to the front brakes and to the rear brakes are separate. This may be accomplished by means of a single master cylinder with a single reservoir having two pistons operating in the same bore and equipped with mechanical projections so that if there is a failure in one of the systems resulting in loss of fluid and/or pressure, the pistons will come into mechanical engagement so that continued depression of the foot pedal will still allow actuation of the other system in which pressure is maintained. It is also possible to have two separate master cylinders operated by a linkage from a single foot pedal in such a manner that pressure applied to the foot pedal will be exerted upon pistons in both of the master cylinders, which may then be equipped with separate hydraulic reservoirs so that the two systems are completely independent.

When systems of either type, generically called dual braking systems, are used in automobiles, a problem has arisen in that when brakes are used only lightly, particularly when a power system is used to apply a mechanical boost to the pedal linkage, the operator of the vehicle will not notice whether both of the systems are operative. One of the systems may develop a leak so that either the front or the rear brakes become inoperative, but as long as only relatively low braking forces are required, operation of the remaining system will produce sufficient braking action to stop the vehicle in such a manner that the failure and inoperativeness of the other system is not noticeable to the operator of the vehicle. Thus, the vehicle may continue to be operated without sufficient braking for emergency stopping conditions without the driver being aware of the failure of the one system.

To overcome this problem, the present invention provides a novel signaling unit for use in connection with dual hydraulic systems such as dual hydraulic brake systems for automobiles which provides an external signal in the event of either a failure or an excessive pressure drop in either one of the systems when the system is pressurized. According to the preferred embodiment of the present invention, a housing is provided with a bore in which is mounted a slidable member which may be biased by springs toward a center position and has opposite ends exposed to the fluid pressure in the two systems. Under conditions in which the pressure in both systems is substantially equal, the application of such balanced pressures to the ends of the slidable member will cause no movement and no signal will be produced. However, if there is a failure in one of the two hydraulic systems so that the pressure build up becomes uneven, the pressure differential applied to one end of the slidable member will cause it to shift in position in the bore so that this movement may be utilized to produce a signal, such as by closing a switch in an electrical circuit. According to the preferred embodiment of this invention, the closing of the electrical circuit is accomplished by contact between the sliding member and a member projecting in its path to produce a signal, for example, by causing the illumination of an indicating light on the dashboard of the automobile.

Further features and advantages of this invention will readily become apparent to those skilled in the art upon a more complete understanding of the invention as shown in the drawings and described in the following detailed description.

Figure 2:
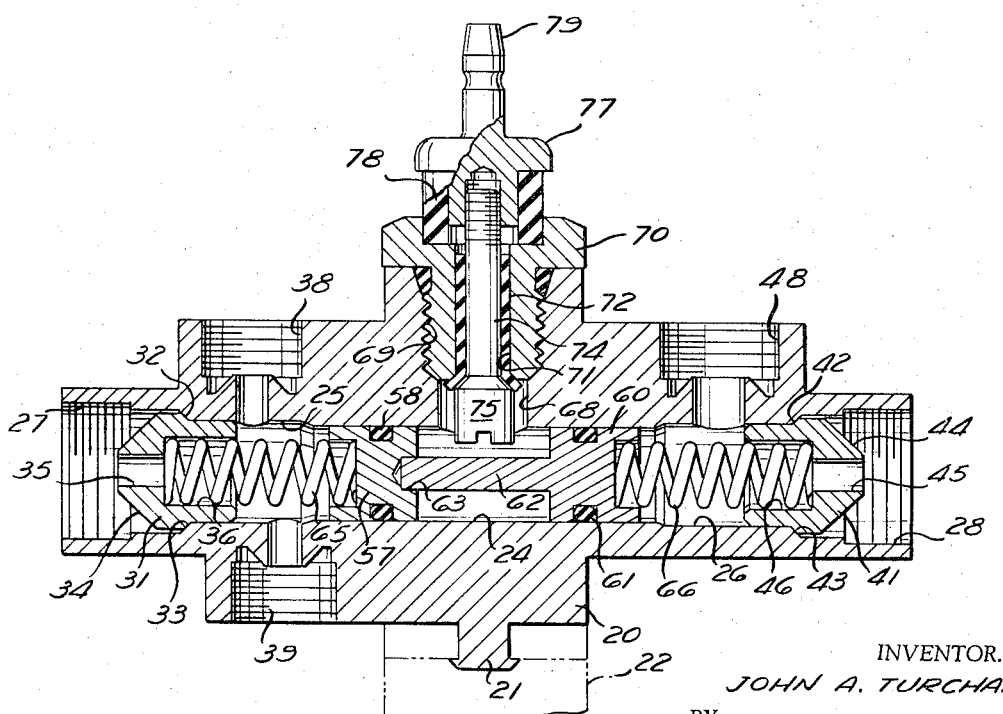

In the drawings:

FIGURE 1 is a schematic view of a dual hydraulic brake system for an automobile incorporating the present invention; and FIGURE 2 is an enlarged cross-sectional view of the signaling unit shown in FIGURE 1.

Referring now to the drawings in greater detail, FIGURE 1 is a schematic showing of a braking system for an automobile in which a master cylinder 10 is mounted on the firewall 11 within the engine compartment and a pivotally mounted foot pedal 13 acts on a piston rod 14 to produce the hydraulic pressure necessary for actuating the brakes. A reservoir 15 on top of the master cylinder supplies hydraulic fluid and the master cylinder, being of the dual type, has two outlet lines 17 and 18 for two separate hydraulic brake circuits for the front wheels and the rear wheels.

The brake lines 17 and 18 lead to the switch of this invention shown in greater detail in FIGURE 2. The switch has a housing 20 which may be formed with a stud 21 for mounting on a bracket 22 secured to the frame of the car for both mounting purposes and electrical grounding for completion of the electric circuit as described in greater detail hereinafter. The housing 20 has as axial bore 24 extending lengthwise therethrough, and at each end of the bore 24 are slightly enlarged counterbores 25 and 26 at the left and right ends, respectively. A threaded inlet 27 is formed at the housing at the left counterbore 25 to receive the front brake line 18 from the master cylinder 10 by a suitable fitting such as the inverted flare type and, likewise, at the right end of counterbore 26 is a threaded inlet fitting 28 to which is connected the line 17 for the rear brakes of the vehicle.

Within the left counterbore 25 is mounted a plug 31 having a shoulder 32 which engages a mating shoulder 33 formed in the counterbore 25 to position the plug. This plug may be a relatively loose fit in the counterbore and is positively positioned by the shoulders 32 and 33. The outer end of the plug is formed with a conical end 34 to receive an inverted flare type fitting for connection between the front brake line 18 and the inlet 27. The plug 31 is formed with a passage 35 therethrough which opens at its inner end into an enlarged recess 36 so that fluid entering through the inlet 27 passes through the plug passage into the interior of the counterbore 25. A pair of outlets 38 and 39, threaded to receive suitable fittings open off the counterbore 25 and are connected by lines 51 and 52 to the front wheel brakes.

In a similar manner, the right counterbore 26 is provided with a plug 41 having a shoulder 42 which abuts against a mating shoulder 43 in the counterbore. The plug 41 has a conical end 44 to receive an inverted flare type fitting and has an axial passage 45 therethrough which opens into a recess 46 on the inner end. It will be understood that plugs 31 and 41 are substantially identical in construction. Thus, the fluid for the rear brakes passes from the master cylinder through line 17 to the inlet 28 and from there through the passage 45 in the plug into the counterbore 26. A suitable threaded outlet 48 opens off the counterbore 26 for connection to the rear brakes through a line 54.

Within the central portion of the axial bore 24 is mounted a left piston 57 which makes sealing contact with the bore by means of an O-ring seal 58. At the right end of the bore is a right piston 60 also making sealing contact with the bore by an O-ring seal 61. The right piston 60 has a reduced diameter projection 62 extending from the left hand end which is received within a recess 63 in the left piston. The projection 62 serves to space the pistons 57 and 60 apart a fixed axial distance, and no connection between them is required to prevent them from moving apart because they are biased toward a center position by springs 65 and 66 which extend between the left and right pistons, respectively, and the left and right plugs 31 and 41 where they fit within the recess 36 and 46, respectively. It will be seen that when the fittings at the inlets 27 and 28 are in place, they hold the plugs 31 and 41 in position so that the springs 65 and 66 bias the pistons 57 and 60 to a center position. The springs 65 and 66 are preferably identical in length and spring rate so that the pistons will be centered in the middle of the bore 24. Assuming the pressures coming from the master cylinder through the lines 17 and 18 and communicated to the inlets 27 and 28 are balanced, because the pistons 57 and 60 are the same diameter they will not move within the bore 24 unless the pressures become unbalanced. This can result from a loss of fluid downstream from the switch on either the front or rear brakes or a loss of fluid supply to the master cylinder affecting only one of the lines 17 and 18. In the event of such pressure imbalance indicating a failure of the corresponding set of brakes, when pressure is applied to the master cylinder 10 by the foot pedal 13, a higher pressure build up at one of the inlets will cause the pistons 57 and 60 to shift against the corresponding biasing spring so as to move away from the center position in the bore.

In order to produce a signal in the event the pistons should move out of position, there is a transverse bore 68 formed in the housing 20 and extending radially outward from the center of the bore 24. At its outer end, the transverse bore 68 is formed with a threaded portion 69 to receive a plug 70. The plug 70 has a bore 71 extending axially therethrough within which is located an insulating sleeve 72 within which in turn is mounted a stud 74. The stud 74 extends with the bore 24 where it has an enlarged head 75, while at the outer end the stud is threadedly received in a cap 77 spaced from the plug 70 by an annular insulating spacer ring 78. The cap 77 at its outer end has a terminal 79 which is connected by a wire 81 to an indicating lamp 82 mounted on the vehicle dashboard 83. The lamp 82 is energized by the automobile battery 85 and since both the housing 20 and the one battery terminal are grounded, whenever contact is made between the stud 74 to the housing 20, the lamp 82 will be lit indicating that the braking system is faulty.

Thus, it will be seen that the pistons 57 and 60 are always in sliding contact with the bore 24 so that they are electrically connected both by contact with the walls of bore 24 and by the engagement through the springs 65 and 66 and hence the plugs 31 and 41 to the housing. So long as the brake pressures supplied through the lines 17 and 18 are substantially equal, the assembly formed by the pistons 57 and 60 will remain substantially centered within the bore 24 by the springs 65 and 66 and the hydraulic pressure. However, a drop in fluid pressure, as previously described, will cause the pistons 57 and 60 to shift the unit in the direction toward the lower pressure. When this is done, the inner ends of the adjacent one of the pistons 57 and 60 moves into abutting contact with the stud head 75 to make electrical contact through the cap terminal 79 and wire 81 to the lamp 82. Thus, whenever the brakes are applied and the pressures are uneven, the dashboard lamp 82 will be turned on to indicate a failure in the system. This arrangement does not cause any excessive drain on the battery because the lamp is lighted only when there is pressure in the system. When the pressure is removed from the brakes and hence from the lines 17 and 18, the springs 65 and 66 will restore the pistons 57 and 60 to the neutral position even if the system is defective to insure the indicator lamp will be lighted only when the brakes are used.

It is recognized that while the invention has been described in detail as being applied to a dual hydraulic brake system for motor vehicles, the switch may be suitable for other applications where a relative balance of fluid pressures is required and may be used in other hydraulic and pneumatic control systems of a dual nature, and such rearrangements as may become apparent to those skilled in the art upon a full understanding of this invention may be resorted to without departing from the scope of the invention as defined in the claims.

What is claimed is:

1. A switch for use in a dual fluid pressure system comprising a housing having a bore therein, a first fluid inlet at one end of said bore, a second fluid inlet at the other end of said bore, piston means slidably mounted in said bore between said fluid inlets, said piston means having first and second axially spaced sealing portions and a portion of reduced diameter between said sealing portions, said piston means making electrical contact with said housing, switch means mounted on said housing and being electrically insulated therefrom, said switch means having a stud projecting into said bore intermediate said sealing portions and arranged to make electrical contact with said piston means when said piston means moves in either direction in said bore from a center position to bring said piston means into abutting contact with said stud, and spring means to bias said piston means to said center position whereby a pressure differential between said first and second inlets is operable to shift said piston means to make said electrical contact.

2. A switch as set forth in claim 1 including fluid chambers in said bore at said first and second inlets and at least one outlet from each chamber whereby the fluid flow from each inlet to its outlet is independent of the flow through the other chamber.

3. A switch for use in a dual fluid pressure system comprising a housing having an axial bore extending from end to end therethrough, a first fluid inlet at one end of said bore, a second fluid inlet at the other end of said bore, a transverse bore in said housing extending radially outward adjacent the mid-point of said axial bore and connected therewith, piston means within said axial bore having first and second axially spaced sealing portions, one on each side of said transverse bore, said piston means having a portion of reduced diameter extenring between said first and second sealing portions spacing said sealing portions a fixed distance apart, said piston means making electrical contact with said housing, switch means mounted on said housing and including a stud member extending through said transverse bore into said axial bore, said stud being electrically insulated from said housing, said switch means including an external terminal insulated from said housing and connected electrically to said stud, and first and second spring means mounted in said bore adjacent said first and second inlets and abutting against opposite outer ends of said piston means and arranged to bias said piston means to a center position wherein said sealing portions are both spaced radially away from said projecting stud, whereby a differential between said first and second inlets is operable to shift said piston means toward the inlet having the lower pressure so that the sealing portion adjacent the higher pressure inlet moves into abutting engagement with said projecting stud to make electrical contact between said piston means and said stud and complete an electric circuit from said external terminal to said housing.

4. A switch as set forth in claim 3 wherein said piston means comprises first and second piston members and said portion of reduced diameter is a projection of diameter less than that of said axial bore on one of said piston members extending toward and abutting against the other of said other piston members.

5. A switch as set forth in claim 3 wherein said fluid inlets are in axial alignment with said axial bore, said switch including first and second plug members in the ends of said axial bore adjacent said first and second inlets, said plug members each defining fluid chambers between said plug members and the adjacent ends of said piston means, said plug members being apertured to allow fluid to flow from the adjacent inlet into the adjacent chamber, said first and second spring means being located in said first and second fluid chambers to each abut at one end against said piston means and at the other end against the adjacent plug member.

6. A switch as set forth in claim 5 including at least one outlet on said housing from each of said fluid chambers.

References Cited
UNITED STATES PATENTS 2,764,176    9/1956    Darquier    303—84
3,228,194    1/1966    Blair    303—84

BERNARD A. GILHEANY, *Primary Examiner.*

H. BROOME, *Assistant Examiner.*

UNITED STATES PATENT OFFICE
CERTIFICATE OF CORRECTION

Patent No. 3,369,090　　　　　　　　　　　　　　February 13, 1968

John A. Turchan

It is certified that error appears in the above identified patent and that said Letters Patent are hereby corrected as shown below:

Column 5, line 3, for "tenring" read -- tending --; line 16, for "radially" read -- axially --.

Signed and sealed this 22nd day of July 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents

Notice of Adverse Decision in Interferences

In Interference No. 96,567 involving Patent No. 3,369,090, J. A. Turchan, DUAL BRAKING SYSTEM SAFETY DEVICE, final judgment adverse to the patentee was rendered Sept. 11, 1969, as to claims 1, 2 and 3.

[*Official Gazette October 28, 1969.*]

Disclaimer

3,369,090.—*John A. Turchan*, East Detroit, Mich. DUAL BRAKING SYSTEM SAFETY DEVICE. Patent dated Feb. 13, 1968. Disclaimer filed July 31, 1969, by the assignee, *The Weatherhead Company*.
Hereby enters this disclaimer to claims 1, 2, and 3 of said patent.
[*Official Gazette November 25, 1969.*]